United States Patent [19]

Kanao

[11] Patent Number: 4,800,928

[45] Date of Patent: Jan. 31, 1989

[54] FLEXIBLE PIPE

[76] Inventor: Shiro Kanao, No. 9~, Nanpeidai 4-chome, Takatsuki-shi, Osaka, Japan

[21] Appl. No.: 49,890

[22] Filed: May 15, 1987

[30] Foreign Application Priority Data

Dec. 26, 1986 [JP] Japan .......................... 61-199495[U]

[51] Int. Cl.$^4$ .............................................. F16L 11/16
[52] U.S. Cl. ................................... 138/122; 138/135; 138/136; 138/144
[58] Field of Search ............... 138/122, 129, 132, 133, 138/135, 136, 150, 153, 144

[56] References Cited

U.S. PATENT DOCUMENTS

| | | | |
|---|---|---|---|
| 714,429 | 11/1902 | Witzenmann | 138/136 |
| 970,955 | 9/1910 | Rubes | 138/136 |
| 1,068,553 | 7/1913 | Abell | 138/135 |
| 1,409,697 | 3/1922 | Fulton . | |
| 2,014,368 | 1/1934 | Blundell . | |
| 2,028,793 | 1/1936 | Moscuch | 138/136 |
| 2,784,010 | 3/1957 | Lifka . | |
| 3,311,133 | 3/1967 | Kinander . | |
| 3,687,169 | 8/1972 | Reynard . | |
| 3,992,044 | 11/1976 | Muslin . | |
| 4,007,761 | 2/1977 | Beckman . | |
| 4,403,631 | 9/1983 | Abdullaev . | |

FOREIGN PATENT DOCUMENTS

| | | |
|---|---|---|
| 164391 | 4/1902 | Fed. Rep. of Germany . |
| 22313 | 12/1905 | Fed. Rep. of Germany . |
| 925506 | 3/1955 | Fed. Rep. of Germany . |
| 1909468 | 10/1964 | Fed. Rep. of Germany . |
| 1921293 | 6/1965 | Fed. Rep. of Germany . |
| 2161597 | 6/1973 | Fed. Rep. of Germany . |
| 2513346 | 3/1983 | France . |

OTHER PUBLICATIONS

Patent Abstracts of Japan, vol. 1, No. 14, (M-76), Mar. 22, 1977, p. 1062, M 76; JP-A-51 126 519, (Totaku Kogyo), 04-11-1976.

Primary Examiner—Werner H. Schroeder
Attorney, Agent, or Firm—Sughrue, Mion, Zinn, Macpeak, and Seas

[57] ABSTRACT

A flexible pipe comprising a flexible solid pipe to which is bonded a spirally wound belt having an S-shaped cross section. The two sides of the belt are bent at parallel acute angles and successive wraps are overlapped. Cords may be inserted into the space formed by the flexible corrugation.

6 Claims, 3 Drawing Sheets

FLEXIBLE PIPE

BACKGROUND OF THE INVENTION

1. Field of the Invention

The present invention relates to a flexible pipe for a wide range of use, e.g., as water supply and drainage pipes for roads, railways and reclaimed land, water supply and waste water drainage pipes for plant premises, various air supply and discharge pipes, underground electric wire protective pipes, other protective pipes for various purposes, and underground pressure resistant pipes. More particularly the invention relates to a flexible pipe composed of a girdling corrugation, roughly S-shaped in transverse cross section, made of rigid material, helically wound and firmly fixed onto the outer wall surface of an inner flexible pipe. Each corrugation girdle has parallel bent ends pointed opposite to each other. An integrated body is formed by consecutively engaging the adjoining bent ends of the corrugations thus would thereon which are movable in the axial direction of the flexible pipe.

2. Background of the Invention

A conventional flexible pipe of the sort described above consists as shown in FIG. 8, of a corrugation $2'$ prepared from rigid metal material. The two ends $2a'$ of each corrugation 2 are perpendicularly bent in transverse cross section. Moreover, the corrugation $2'$ are wound onto the wall surface (inner wall surface in this case) of a flexible pipe $1'$ made of flexible material. The adjoining bent ends $2a'$ of the corrugations $2'$ thus wound and anchored together are movably engaged in the axial direction of the flexible pipe so that the pipe as a whole becomes flexible.

Further, the same inventor has filed U.S. patent application Ser. No. 944,067 entitled "Flexible Hard Pipe" on Dec. 20, 1986.

In the aforesaid conventional flexible pipe, both ends $2a'$ of the corrugation are perpendicularly bent and the direction in which the ends thereof are bent conforms to the diametric direction of the flexible pipe $1'$ after the corrugations $2'$ are wound onto the wall surface of the flexible pipe $1'$ into a flexible pipe. When great bending stress is applied to the flexible pipe, the bent ends $2a'$ are therefore caused to move in the diametric direction of the pipe and both the ends $2a'$ engaged with each other tend to easily disengage. The problem is that such a flexible pipe can crack.

Although an attempt has been made to solve the aforesaid problem by spirally inserting a cord or the like in between the two bent ends $2a'$ engaged with each other, that problem is still left unsolved.

SUMMARY OF THE INVENTION

An object of the present invention is provide a flexible pipe not presenting such a problem.

The flexible pipe according to the present invention is characterized in that it comprises a flexible pipe made of flexible material. Corrugations, roughly S-shaped in transverse cross section, made of rigid material, are helically wound and firmly fixed onto the outer wall surface of the flexible pipe. Each corrugation has parallel bent ends pointed opposite to each other. A rigid flexible layer is formed by engaging the adjoining bent ends of the corrugations thus would thereon movably in the axial direction of the inner flexible pipe, the ends being bent at an acute angle.

In the flexible pipe according to the present invention, since the ends of each corrugation are bent at an acute angle, the bent ends are kept engaged even if the bent ends are forced to move in the axial direction of the flexible pipe becuase of great bending stress applied thereto. The bent ends are prevented from moving in the axial direction of the flexible pipe so that they are disengaged only with great difficulty.

Consequently, the flexible pipe according to the present invention is resistant to great applied bending stress and the crack arresting structure helps improve its quality.

BRIEF DESCRIPTION OF THE DRAWINGS

FIG. 1 is a partial sectional side view;

FIG. 2 is an enlarged view of the principal part;

FIG. 3 through 7 are enlarged sectional views of the principal part of still another embodiment;

DETAILED DESCRIPTION OF THE PREFERRED EMBODIMENTS

Figure 1:
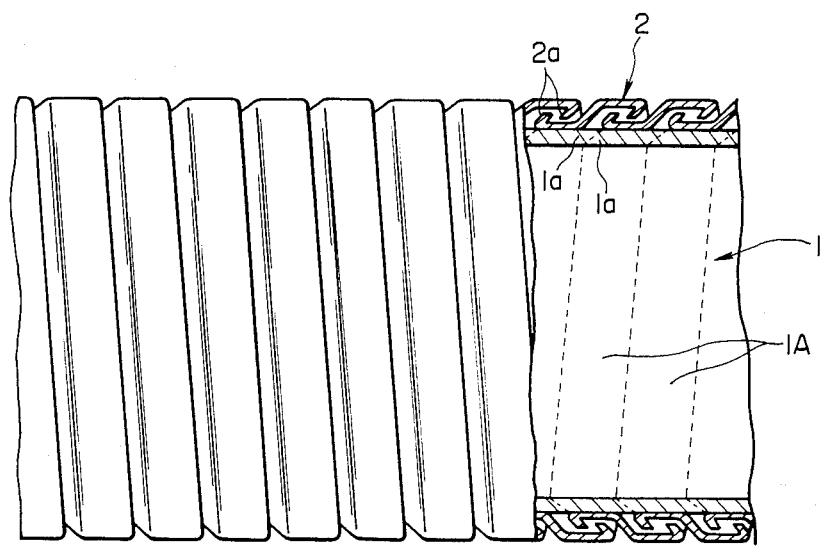
FIGS. 1 through 7 shows flexible pipes embodying the present invention.

Referring now to the drawings, embodiments of the present invention will be described.

Figure 2:
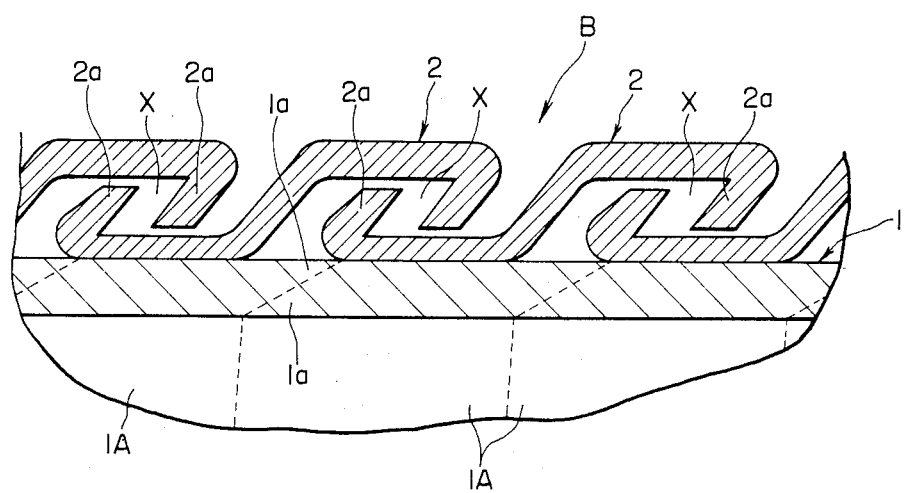

As shown in FIGS. 1 and 2, one or more flexible plastic flat bands or belts 1A are spirally wound into an inner flexible pipe 1. The two adjoining side edges $1a$ of the flat bands 1A thus wound are coupled and integrally fusion welded (anchored) to form a helical pipe.

A Corrugated belt or band 2 made of rigid plastics (e.g., plastics of PVC) are spirally wound onto the outer wall surface of the aforesaid inner flexible pipe 1. Each corrugated band 2, roughly S-shaped in transverse cross section, has two parallel bent ends $2a$ pointed opposite to each other and inclined at an acute angle so as to form a "hook-like" shape. The two adjoining bent ends $2a$ of each corrugated band 2 thus wound onto the outer wall surface of the flexible pipe 1 are engaged with a gap X (FIG. 2) therebetween in the axial direction of the flexible pipe 1. Thereby the bent ends of the corrugated bands 2 are movably and integrally coupled in their axial direction to form a rigid flexible pipe B. Moreover, each corrugated band 2 is partly in contact with the outer wall surface of the inner flexible pipe 1 and that portion in contact therewith is fusion welded (anchored) to the wall surface thereof.

In this flexible pipe according to the present invention, since the two ends $2a$ of each corrugated band 2 are bent at an acute angle, the bent ends $2a$ are kept engaged even if great bending stress is applied and are hardly disengaged because their bent ends $2a$ catch each other.

Figure 3:
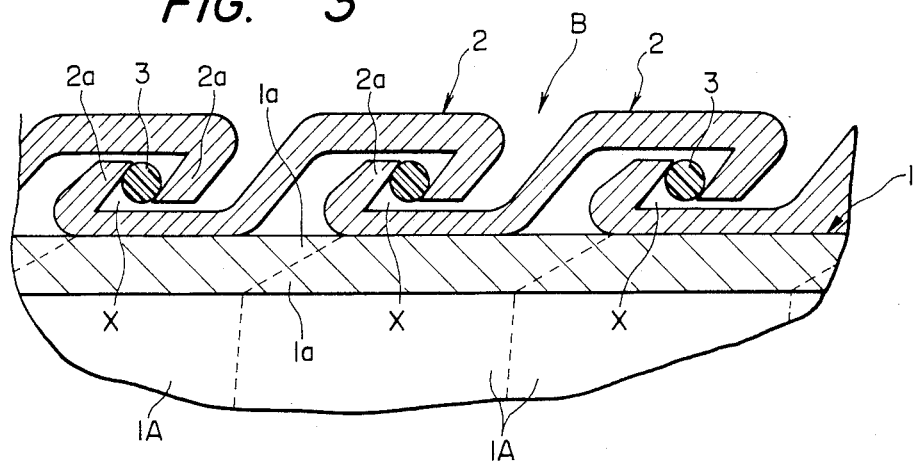
Figure 4:
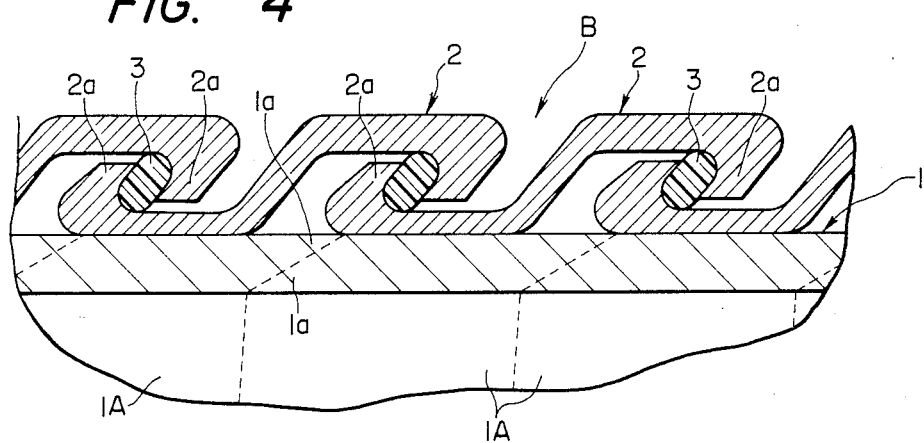

Several additional embodiments will now be described. In a first additional embodiment, a flexible plastic cord 3 is, as shown in FIGS. 3 or 4, inserted into each gap X where the adjoining bent ends $2a$ of the aforesaid corrugated band 2 engage with each other to form the rigid flexible pipe B to further ensure that the bent ends $2a$ of the corrugated bands 2 are prevented from disengaging. The cord 3 may be circular in cross section to only partially fill the gap X (see FIG. 3) or may be oval in cross section so that no gap X is left (see FIG. 4). However, the oval cross section is superior to the circular cross section in resistance to cracking at the time of bending deformation. Although no gap X is left in the case of the oval cross section, the bent ends 2a are needless to say allowed to move in the axial direction of the flexible pipe because the cord 3 is flexible. Moreover, the resistance to cracking at the time of bending deformation will be further improved provided the cord 3 and the bent ends 2a are totally or partially bonded.

Figure 7:
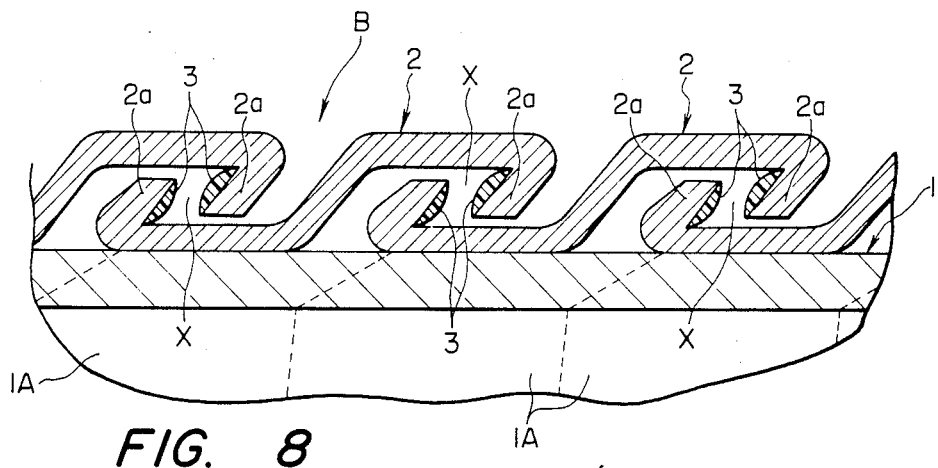
Figure 8:
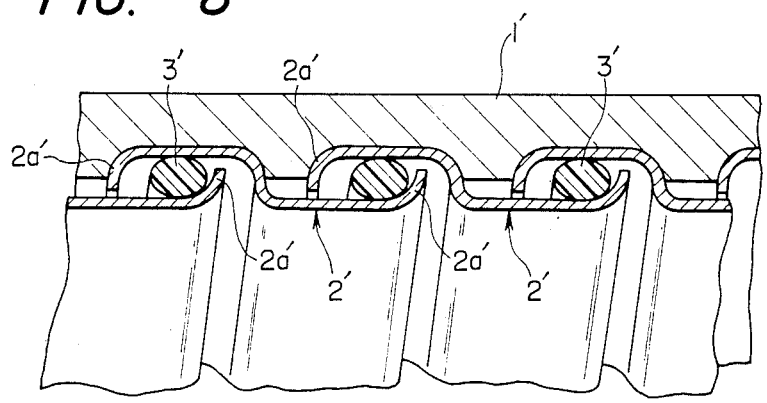
FIG. 8 is an enlarged sectional view of a conventional flexible pipe.

As shown in FIG. 7, a pair of flexible plastic cords may be inserted into the gap X. More specifically, the pair of cords 3 are roughly crescent in cross section and one side of the crescent is attached to each bent end 2a.

Figure 5:
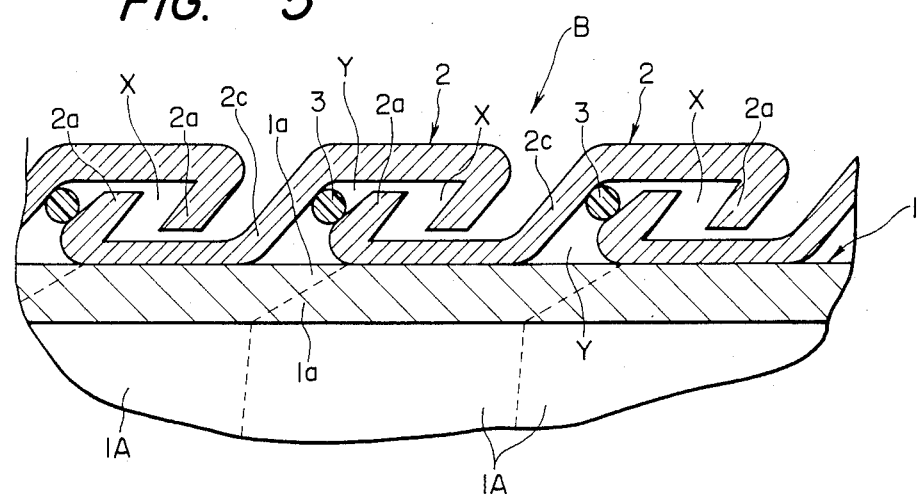

In a second additional embodiment, as shown in FIG. 5, the aforesaid rigid flexible pipe B may instead have the cord 3 in the gap between the intermediate portion 2c of the S-shaped corrugated belt and the bent end 2a adjacent to the intermediate portion.

Figure 6:
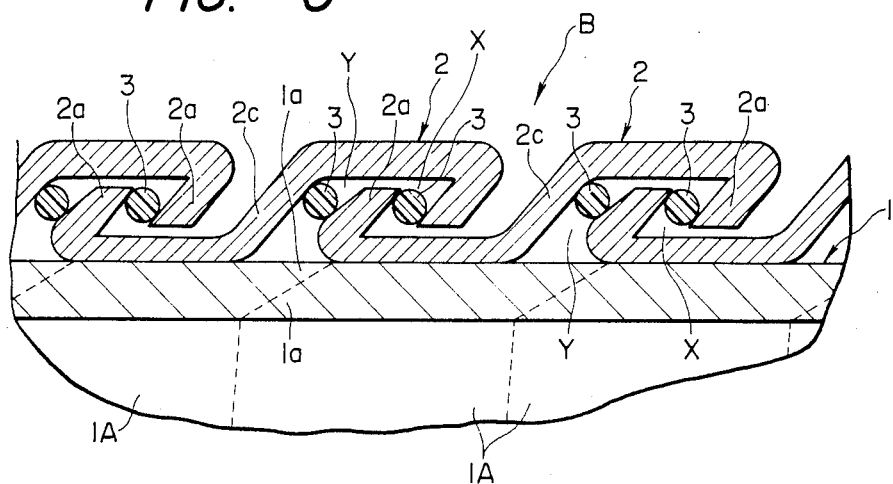

In the third additional embodiment, the aforesaid rigid flexible pipe B may have two cords 3 in both the gaps X and Y as shown in FIG. 6.

Although the previous embodiments have been described in which the corrugated belt 2 is wound onto the outer wall surface of the flexible pipe 1, in a fourth additional embodiment the corrugated belt is wound onto the inner wall surface of the flexible pipe 1.

Furthermore, use can be made of fiber reinforced plastics, fiber reinforced metals, fiber reinforced rubber, rigid rubber and metals other than the aforesaid rigid plastics: e.g., rigid polyolefin plastics, rigid PVC plastics, etc. as rigid material for the corrugated belt.

Also, the flexible material for the flexible pipe 1 and the cord 3 is not limited to the aforesaid flexible plastics.

Although reference numerals are employed in claims of the present application to facilitate reference to the accompanying drawings, the present invention is not limited to the construction shown in the drawings.

What is claimed is:

1. A flexible pipe comprising:
   an inner flexible solid pipe (1) made of flexible material; and
   at least one outer belt (2), roughly S-shaped in transverse cross section, made of rigid material, helically wound and firmly fixed onto a wall surface of said flexible pipe (1), each belt having two intermediate portions offset from each other in a radial direction and a central portion disposed between said intermediate portions for connecting said intermediate portions, one of said two inntermediate portions being proximate to an outer surface of said inner flexible pipe, and having parallel hook-like ends (2a, 2a) pointed opposite to each other and bent radially toward each other at acute angles relative to said intermediate portions of said belt to form a rigid flexible layer, and wherein said inner flexible solid pipe consists of a soft pipe , said at least one outer belt (2) is made of a material selected from the group consisting of hard synthetic resin, fiber reinforced plastic, and fiber reinforced rubber, the one of said intermediate portions of said outer belt which is proximate to the outer surface of said inner flexible solid pipe is fused to and conforms to said outer surface of said flexible solid pipe, and wherein bent ends of said at least one outer belt, at adjacent turns, are adjoining and the adjoining bent ends of said at least one outer belt are engaged such that said hook-like bent ends form spaces therebetween allowing the belt to be displaed in the axial direction of the inner flexible solid pipe.

2. A flexible pipe as claimed in claim 1, wherein said rigid flexible layer (B) includes a cord (3) inserted between the adjoining bent ends (2a, 2a) of said at least one belt thus wound outer on said solid pipe.

3. A flexible pipe as claimed in claim 1, wherein said rigid flexible layer (B) includes a cord (3) between said central portion (2c) of one of said adjacent turns of said outer belt (2) and the central portion (2c) of another of said adjacent turns of said belt.

4. A flexible pipe as claimed in claim 1, wherein said rigid flexible layer (B) includes cords (3), (3) both between adjoining bent ends (2a, 2a) of said at least one outer belt thus wound onto said flexible solid pipe (1) and between a central portion (2c) between said intermediate portions of said at least one S-shaped outer belt (2) thus wound, a bent end (2a) and said solid pipe.

5. A flexible pipe as claimed in claim 1, wherein said rigid flexible layer (B) includes a pair of cords (3), (3) "attached" on surfaces of said adjoining bent ends of said at least one outer belt, respectively, and said surfaces face each other.

6. A flexible pipe as claimed in claim 5, wherein said pair of cords (3), (3) are roughly crescent in a cross section along said axial direction.

* * * * *